United States Patent
Lee

(10) Patent No.: US 10,503,298 B2
(45) Date of Patent: Dec. 10, 2019

(54) TOUCH SENSOR INTEGRATED TYPE DISPLAY DEVICE

(71) Applicant: LG DISPLAY CO., LTD., Seoul (KR)

(72) Inventor: Jaegyun Lee, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 15/793,620

(22) Filed: Oct. 25, 2017

(65) Prior Publication Data
US 2018/0120992 A1     May 3, 2018

(30) Foreign Application Priority Data

Oct. 28, 2016  (KR) .................. 10-2016-0142052

(51) Int. Cl.
*G06F 3/041*  (2006.01)
*G06F 3/044*  (2006.01)
*G06F 3/047*  (2006.01)

(52) U.S. Cl.
CPC ............ *G06F 3/0412* (2013.01); *G06F 3/044* (2013.01); *G06F 3/047* (2013.01); *G06F 3/0416* (2013.01); *G06F 2203/04107* (2013.01); *G06F 2203/04112* (2013.01)

(58) Field of Classification Search
USPC ........................................ 345/173, 174, 204
See application file for complete search history.

(56) References Cited

U.S. PATENT DOCUMENTS

| | | | |
|---|---|---|---|
| 2016/0054846 A1* | 2/2016 | Lee .................. | G06F 3/0416 345/174 |
| 2016/0109987 A1* | 4/2016 | Teranishi .......... | G09G 3/3696 345/174 |
| 2016/0139707 A1* | 5/2016 | Nakamura .......... | G06F 3/044 345/174 |
| 2016/0147283 A1* | 5/2016 | Cho .................. | G06F 3/0412 345/173 |
| 2016/0162087 A1* | 6/2016 | Lee .................. | G02F 1/13338 345/173 |
| 2016/0179229 A1* | 6/2016 | Ahn .................. | G06F 3/041 345/173 |
| 2016/0188044 A1* | 6/2016 | Ishizaki ............. | G06F 3/0412 345/174 |
| 2016/0195963 A1* | 7/2016 | Esaka ................ | G06F 3/044 345/174 |

\* cited by examiner

*Primary Examiner* — Thuy N Pardo
(74) *Attorney, Agent, or Firm* — Birch, Stewart, Kolasch & Birch, LLP

(57) ABSTRACT

Disclosed herein is a touch sensor integrated type display device including gate lines; data lines; and pixel electrodes to which data signals are supplied through the data lines; touch/common electrodes; touch/common routing wirings connected to the touch/common electrodes to supply a common voltage and a touch driving signal; and dummy routing wires not connected to the touch/common electrodes. The common voltage is supplied to the touch/common routing wires and the dummy routing wires during a display operation period, and the touch driving signal is supplied to the touch/common routing wires and a load free driving signal is supplied to the dummy routing wires during a touch operation period.

20 Claims, 9 Drawing Sheets

TOUCH SENSOR INTEGRATED TYPE DISPLAY DEVICE

CROSS-REFERENCE TO RELATED APPLICATION

This application claims the benefit of priority under 35 U.S.C. § 119(a) to Patent Application No. 10-2016-0142052 filed in Republic of Korea on Oct. 28, 2016, the entire contents of which is incorporated herein by reference for all purposes as if fully set forth herein.

BACKGROUND OF THE INVENTION

Field of the Invention

This disclosure relates to a display device, in particular a touch sensor integrated type display device.

Discussion of the Related Art

In recent years, various input devices, such as a keyboard, a mouse, a track ball, a joystick, and a digitizer, have been used to allow users to interface with home appliances or information telecommunication devices. However, when the user makes use of these input devices, the user's dissatisfaction with the input devices increase because the user is required to learn how to use the input devices and the input devices occupy additional space. Thus, a demand for a convenient and simple input device capable of reducing erroneous operations is increasing. In response to the demand, a touch sensor was proposed to recognize information when the user inputs the information by directly touching or being proximate to the screen with his or her finger or a pen.

The touch sensor has a simple configuration capable of reducing the erroneous operations. The user can also perform an input action without using a separate input device and can quickly and easily manipulate a display device through the contents displayed on the screen. Thus, the touch sensor has been applied to various display devices.

The touch sensor used in the display device may be classified into an add-on type touch sensor, an on-cell type touch sensor, and an integrated type (or in-cell type) touch sensor depending on its structure. The add-on type touch sensor is configured such that the display device and a touch sensor module including the touch sensor are individually manufactured and then the touch sensor module is attached to an upper substrate of the display device. The on-cell type touch sensor is configured such that elements constituting the touch sensor are directly formed on the surface of an upper glass substrate of the display device. The in-cell type touch sensor is configured such that elements constituting the touch sensor are formed inside the display device to thereby achieve a thin profile of the display device and increase the durability of the display device.

The add-on type touch sensor causes the thickness of a display device to increase because the add-on type touch sensor has a structure in which it is mounted on the display device. Further, visibility of the display device is reduced because of a reduction in a brightness of the display device resulting from the increased thickness.

The on-cell type touch sensor shares the glass substrate with the display device because the on-cell type touch sensor has the structure in which it is formed on the surface of the glass substrate of the display device. Therefore, a thickness of the display device using the on-cell type touch sensor is less than that of the display device using the add-on type touch sensor. However, the entire thickness of the display device implementing the on-cell type touch sensor increases because of use of a touch driving electrode layer, a touch sensing electrode layer, and an insulating layer for insulating the touch driving electrode layer and the touch sensing electrode layer which constitute the on-cell type touch sensor.

Accordingly, development directions of the touch sensor are focused on the integrated type touch sensor in that it is possible to achieve a thin shape of the display device and enhance a durability of the display device, thereby resolving the problems of the add-on type and on-cell type touch sensors. The integrated type touch sensor may be classified into an optical touch sensor and a capacitive touch sensor depending on a method for sensing touched positions. Also, the capacitive touch sensor may be sub-classified into a self capacitive touch sensor and a mutual capacitive touch sensor.

The self capacitive touch sensor forms a plurality of independent patterns in a touch area of a touch sensing panel and measures changes in a capacitance of each independent pattern, thereby deciding whether or not a touch operation is performed. The mutual capacitive touch sensor crosses X-axis electrode lines (for example, driving electrode lines) and Y-axis electrode lines (for example, sensing electrode lines) in a touch/common electrode formation area of a touch sensing panel to form a matrix, applies a driving pulse to the X-axis electrode lines, and senses changes in a capacitance between the X-axis electrode lines and the Y-axis electrode lines through the Y-axis electrode lines, thereby deciding whether or not a touch operation is performed.

In the mutual capacitive touch sensor, a mutual capacitance generated in touch recognition of the mutual capacitive touch sensor is very small, but parasitic capacitances between gate lines and data lines constituting the display device are very large. Therefore, it is difficult to accurately recognize touch positions because of the parasitic capacitances.

Further, because a plurality of touch driving lines for a touch driving operation and a plurality of touch sensing lines for a touch sensing operation have to be formed on the common electrode for the multi-touch recognition of the mutual capacitive touch sensor, the mutual capacitive touch sensor requires a very complex line structure.

On the other hand, the self capacitive touch sensor has a simpler line structure than the mutual capacitive touch sensor, and touch accuracy may increase. Hence, the self capacitive touch sensor has been widely used due to a need.

A related art self capacitive touch sensor integrated type display device (whereinafter, referred to as a touch sensor integrated type display device) is described below with reference to FIGS. 1 to 2C.

FIG. 1 is a planar view schematically illustrating a related art touch sensor integrated type display device. FIG. 2A is a planar view schematically illustrating a relationship between pixel electrodes and one touch/common electrode in an area corresponding to the touch/common electrode shown in FIG. 1. FIG. 2B is a cross sectional view illustrating a region R1 shown in FIG. 2A, and FIG. 2C is a cross sectional view illustrating a region R2 shown in FIG. 2A.

Referring to FIG. 1, the touch sensor integrated type display device includes an active area AA, in which touch/common electrodes are arranged and data are displayed, and a bezel area BA positioned outside the active area AA. In the bezel area BA, various wires and a source and touch driving integrated circuit 10 are disposed.

The active area AA includes a plurality of touch/common electrodes Tx11 to Tx14, Tx21 to Tx24, . . . , and Tx51 to Tx54, and a plurality of touch routing wires TW11 to TW14, TW 21 to TW24, . . . , and TW51 to TW54 connected to the plurality of touch/common electrodes Tx11 to Tx14, Tx21 to Tx24, . . . , and Tx51 to Tx54, respectively. The plurality of touch/common electrodes Tx11 to Tx14, Tx21 to Tx24, . . . , and Tx51 to Tx54 are arranged in a first direction (e.g. x-axis direction) and a second direction (e.g. y-axis direction) which cross each other. The plurality of routing wires TW11 to TW14, TW 21 to TW24, . . . , and TW 51 to TW54 are arranged in parallel (in the same direction or side-by-side) to each other in the second direction.

The plurality of touch/common electrodes Tx11 to Tx14, Tx21 to Tx24, . . . , and Tx51 to Tx54 are formed by dividing a common electrode of a display device. The plurality of touch/common electrodes Tx11 to Tx14, Tx21 to Tx24, . . . , and Tx51 to Tx54 are operated as common electrodes during a display operation period for displaying data, and operated as touch/common electrodes during a touch operation period for perceiving touch positions.

The bezel area BA is positioned outside the active area AA, and includes various wires and the source and touch driving integrated circuit 10. The source and touch driving integrated circuit 10 supplies display data to data lines in synchronization with driving of gate lines of the display device, and supplies a common voltage to the touch/common electrodes Tx11 to Tx14, Tx21 to Tx24, . . . , and Tx51 to Tx54 during the display operation period. Also, the source and touch driving integrated circuit 10 supplies a touch driving voltage to the touch/common electrodes Tx11 to Tx14, Tx21 to Tx24, . . . , and Tx51 to Tx54, and determines touch positions at which touches are performed by scanning changes of capacitance in the touch/common electrodes before and after the touch is performed during the touch operation period. The various wires disposed in the bezel area BA include the touch routing wires TW11 to TW14, TW21 to TW24, . . . , and TW51 to TW54, gate lines and data lines extended from the active area AA and connected to the source and touch driving integrated circuit 10.

As described above, when conductive objects such as fingers or stylus pens are touched on the active area AA of the touch sensor integrated type display device, it is possible to determine touch positions at which touches are performed by scanning changes of capacitance in touch/common electrodes before and after the touch is performed. More specifically, a touch driving voltage is supplied to the touch/common electrodes Tx11 to Tx14, Tx21 to Tx24, . . . , and Tx51 to Tx54 in the active area AA, and then the touch/common electrodes Tx11 to Tx14, Tx21 to Tx24, . . . , and Tx51 to Tx54 are sensed through the touch routing wires TW11 to TW14, TW 21 to TW24, . . . , and TW51 to TW54. It is possible to determine touch positions at which touches are performed based on changes of capacitance in the touch/common electrodes before and after the touch is performed.

However there are some problems such as a mura defect in the touch sensor integrated type display device. This is due to the fact that an electric field difference is generated in pixels according to positions of routing wires TW11 to TW14, TW21 to TW24, . . . , and TW51 to TW54 connected to the touch/common electrodes Tx11 to Tx14, Tx21 to Tx24, . . . , and Tx51 to Tx54. That is, because the positions of the routing wires TW11 to TW14, TW21 to TW24, . . . , and TW51 to TW54 connected to the touch/common electrodes Tx11 to Tx14, Tx21 to Tx24, . . . , and Tx51 to Tx54 are different from each other, electric fields at particular positions are different. Hereinafter, the reason for the mura defect generation is described in greater detail with reference to FIGS. 2A to 2C.

In the FIGS. 2A to 2C, omitted is the description of the thin film transistors disposed under pixel electrodes to obviate complication of description. In an example of FIG. 2A, one touch/common electrode Tx11 has a size corresponding to three pixels in a horizontal direction and the three pixels in a vertical direction, for a total of 9 pixels P11 to P13, P21 to P23 and P31 to P33.

Referring to FIGS. 2A to 2C, data lines DL1 to DL3 are disposed on a gate insulation layer GI covering the gate lines GL1 to GL3. The pixel electrodes P11 to P13, P21 to P23 and P31 to P33 are disposed on an insulation layer INS covering the data lines DL1 to DL3. The routing wire TW11 is disposed on a first passivation layer PAS1 covering the pixel electrodes P11 to P13, P21 to P23 and P31 to P33. The other routing wires TW12 to TW14, TW21 to TW24, . . . and TW51 to TW54 shown in FIG. 1 are also disposed on the first passivation layer PAS1. The touch/common electrode Tx11 is disposed on a second passivation layer PAS2 covering the routing wire TW11. The other touch/common electrodes Tx12 to Tx14, Tx21 to Tx24, . . . and Tx51 to Tx54 shown in FIG. 1 are also disposed on the second passivation layer PAS2. The touch/common electrode Tx11 is connected to the routing wire TW11 exposed through a contact hole CH1 of the second passivation layer PAS2.

In the touch sensor integrated type display device, there are two regions R1 and R2 in one touch/common electrode (for example, Tx11). The first region R1 is a region where the routing wire TW11 is disposed to overlap the data line DL1 as shown in FIGS. 2A and 2B. The second region R2 is a region where no routing wire is disposed to overlap the data line DL1 as shown in FIGS. 2A and 2C.

Accordingly, there is no parasitic capacitance in the first region R1 because an electric field between the data line DL1 and the pixel electrode P11 is cut off by the routing wiring TW11 as shown in FIGS. 2A and 2B. However, a parasitic capacitance which affects a liquid crystal layer disposed above the touch/common electrode Tx11 is generated by an electrical field formed between the pixel electrode P12 and the data line DL2 in the second region R2 because there is no routing wires to be overlapped with the data line DL2 as shown in FIGS. 2A and 2C.

The parasitic capacitance obstructs normal driving of liquid crystal molecules during a display operation, thereby causing display defects due to a light leakage. Accordingly, there is a need to prevent the above-mentioned problems.

SUMMARY OF THE INVENTION

An object of this disclosure is to provide a touch sensor integrated type display device capable of preventing bad image quality by preventing a display image from being defective due to an electric field difference in each pixel by constructing an arrangement of touch routing wires corresponding to all pixels of the display device equally.

A touch sensor integrated type display device according to this disclosure includes a plurality of gate lines; a plurality of data lines crossing over the plurality of gate lines; a plurality of pixel electrodes to which data signals are supplied through the plurality of data lines; a plurality of touch/common electrodes; a plurality of touch/common routing wires connected to the plurality of touch/common electrodes to supply a common voltage and a touch driving signal based on a time division method of time-dividing one frame period into a display operation period and a touch operation period; and a plurality of dummy routing wires transversing the plurality of touch/common electrodes and arranged in the same direction with the plurality of touch/common routing wires, and not connected to the plurality of touch/common electrodes in an active area, wherein the common voltage is supplied to the plurality of touch/common routing wires during the display operation period, and wherein the touch driving signal is supplied to the plurality of touch/common routing wires and a load free driving signal is supplied to the plurality of dummy routing wires during the touch operation period.

The touch sensor integrated type display device further includes a modulation signal wire connected to the plurality of dummy routing wires; a source and touch driving integrated circuit configured to supply the common voltage to the plurality of touch/commeon electrodes; and a modulation signal supplier configured to supply the common voltage and the load free driving signal to the modulation signal wire, and to supply the common voltage to the source and touch driving integrated circuit.

The touch sensor integrated type display device further includes a source and touch driving integrated circuit configured to supply the common voltage and the touch driving signal to the plurality of touch/common routing wires, and to supply the common voltage and the load free driving signal to the plurality of dummy routing wires; and a modulation signal supplier configured to supply the common voltage, the touch driving signal and the load free driving signal to the source and touch driving integrated circuit.

The touch sensor integrated type display device further includes a dummy connection wire connecting the plurality of dummy routing wires, wherein the source and touch driving integrated circuit is further configured to supply the common voltage and the load free driving signal to the dummy connection wire.

The plurality of dummy routing wires include a first group of dummy routing wires and a second group of dummy routing wires which are respectively disposed at one side or both sides of the plurality of touch/common routing wires.

The touch sensor integrated type display device further includes a ground wire disposed adjacent to the plurality of touch/common routing wires and connected to the modulation signal supplier; and electrostatic discharge circuits disposed between the ground wire and the plurality of data lines, each of the electrostatic discharge circuits having one end connected to the ground wire and another end connected to each of the plurality of data lines.

According to another aspect of the present disclosure, a touch sensor integrated type display panel comprising: a plurality of gate lines and a plurality of data lines defining a plurality of pixel regions; a plurality of touch/common electrodes overlapping the plurality of pixel regions; a plurality of touch/common routing wires connected to the plurality of touch/common electrodes; and a plurality of dummy routing wires arranged in the same direction with the plurality of touch/common routing wires, wherein a common voltage is supplied to the plurality of touch/common routing wires during a display operation period of one frame period, and wherein a touch driving signal is supplied to the plurality of touch/common routing wires and a load free driving signal is supplied to the plurality of dummy routing wires during a touch operation period of the one frame period.

According to the touch sensor integrated type display device of this disclosure, liquid crystal molecules are driven by a voltage difference between the common voltage supplied to the touch/common electrodes and the data voltages supplied to the pixel electrodes during a display operation period, thereby varying transmittance of light. Accordingly, it is possible to display images on the display panel. On the other hand, during a touch operation period, the touch driving signal is supplied to the touch/common routing wires, and the load free driving signal having the same phase and amplitude as the touch driving signal is supplied to the dummy routing wires. There is no parasitic capacitance between the touch/common electrodes and the dummy routing wires because the same signal is supplied to the touch/common electrodes and the dummy routing wires. Accordingly, a visible mura due to a light leakage that may be generated by the parasitic capacitance formed between the touch/common electrodes and the dummy routing wires is not generated, and the display image defect can be prevented or reduced.

Also, when inspecting wiring fault, it is possible to smoothly carry out open and short inspection of the touch/common routing wires and the dummy routing wires because the touch/common routing wires and the dummy routing wires have a configuration connected without a disconnected portion in the active region.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
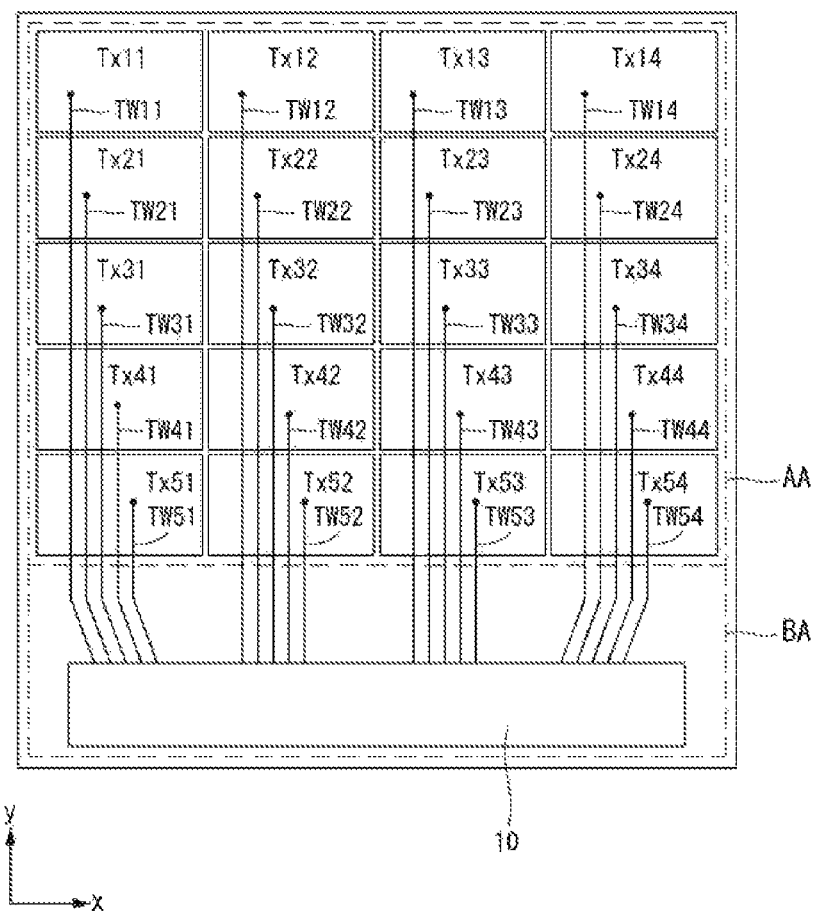
FIG. 1 is a planar view schematically illustrating a related art touch sensor integrated type display device.
Figure 2A:
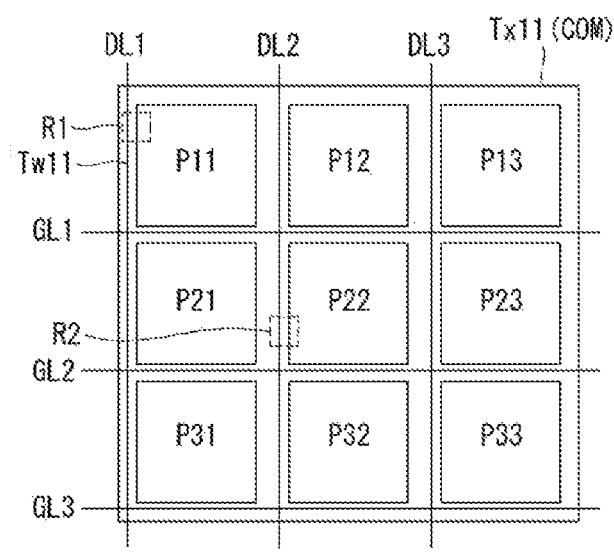
FIG. 2A is a planar view schematically illustrating a relationship between pixel electrodes and one touch/common electrode in an area corresponding to the touch/common electrode shown in FIG. 1.
Figure 2B:
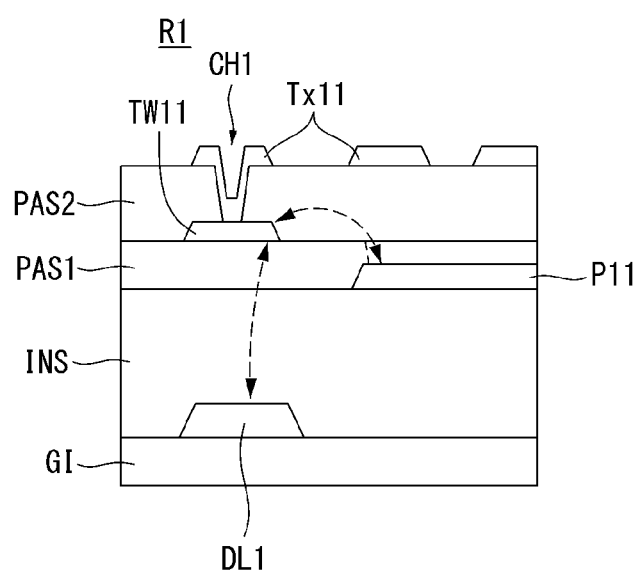
FIG. 2B is a cross sectional view illustrating a region R1 shown in FIG. 2A.
Figure 2C:
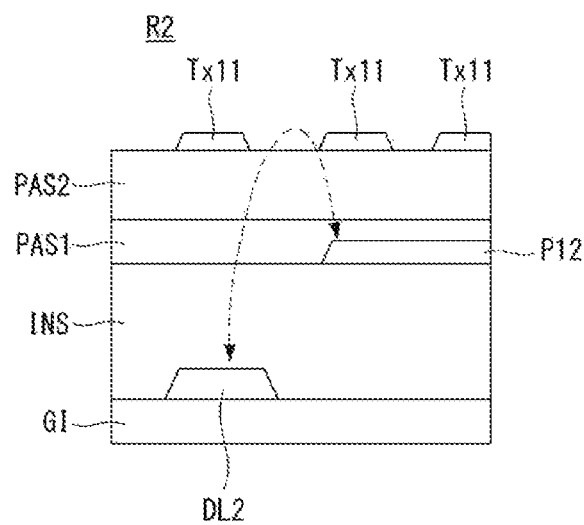
FIG. 2C is a cross sectional view illustrating a region R2 shown in FIG. 2A.

Hereinafter, embodiments of the present invention are described in detail with reference to the accompanying drawings. In the specification, the same reference numerals denote the same elements. In the following description, a detailed description of the known functions and constitutions will be omitted if it is deemed to obscure the embodiments of the present invention. Furthermore, the names of elements used in the following description have been selected by taking into consideration only the ease of writing this specification and may be different from the names of actual parts. Also, as an example of the touch sensor integrated type n display device, a touch sensor integrated type liquid crystal display device will be described in detail.

A touch sensor integrated type display device according to an embodiment of this disclosure is described below with reference to FIGS. 3 to 6.

Figure 3:
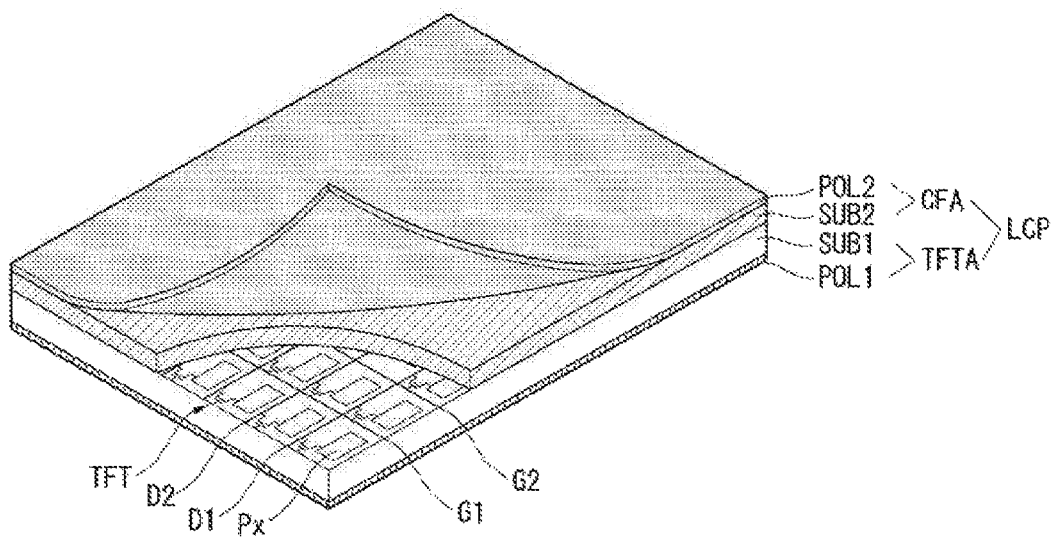
FIG. 3 is a partially exploded perspective view schematically showing a touch sensor integrated type display device according to an embodiment of this disclosure.
Figure 4:
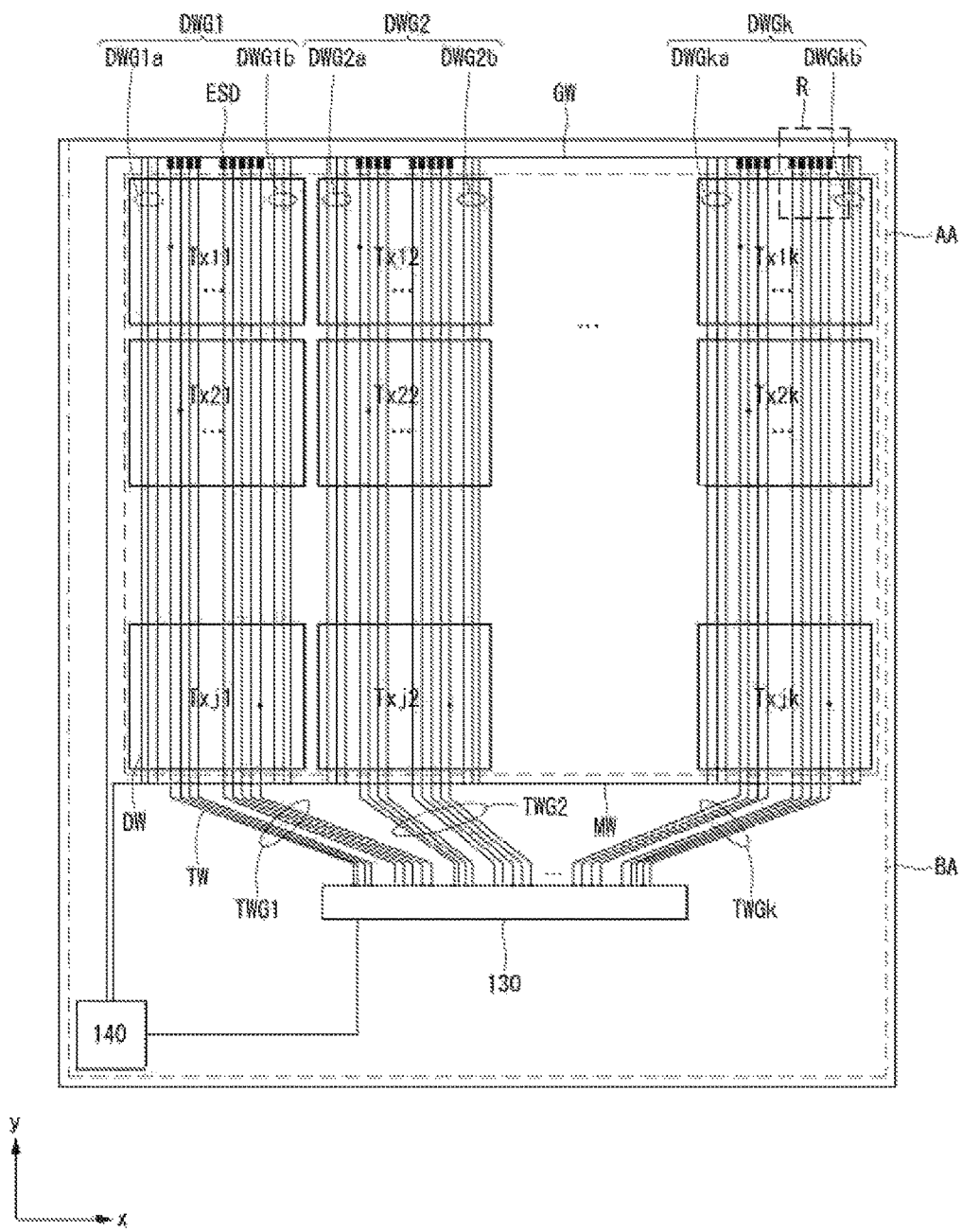
FIG. 4 is a planar view schematically showing a touch sensor integrated type display device according to a first embodiment of this disclosure.
Figure 5:
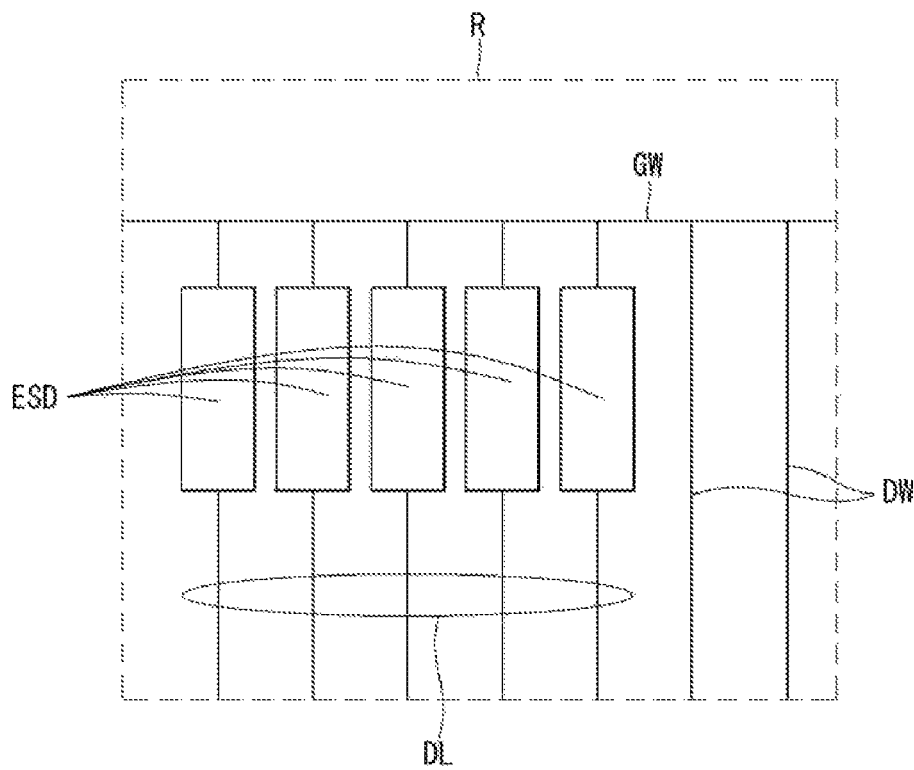
FIG. 5 is a planar view illustrating a region R shown in FIG. 4.
Figure 6:
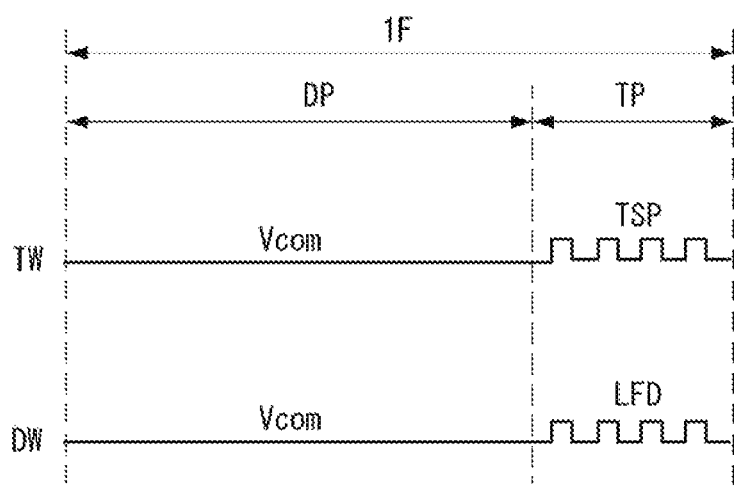
FIG. 6 is a waveform diagram illustrating modulation signals supplied to dummy routing wires and touch routing wires shown in FIG. 4.

FIG. 3 is a partially exploded perspective view schematically showing a touch sensor integrated type display device according to an embodiment of this disclosure. FIG. 4 is a planar view schematically showing a touch sensor integrated type display device according to a first embodiment of this disclosure. FIG. 5 is a planar view illustrating a region R shown in FIG. 4, and FIG. 6 is a waveform diagram illustrating modulation signals supplied to dummy routing wires and touch routing wires shown in FIG. 4.

Referring to FIG. 3, the touch sensor integrated type display device includes a liquid crystal display panel LCP having a thin film transistor (TFT) array TFTA and a color filter array CFA which are positioned opposite each other with a liquid crystal layer interposed therebetween.

The TFT array TFTA includes a plurality of gate lines G1 and G2 which may be arranged in parallel in a first direction (for example, x-axis direction) on a first substrate SUB1, a plurality of data lines D1 and D2 which may be arranged in parallel in a second direction (for example, y-axis direction) to cross over the plurality of gate lines G1 and G2, thin film transistors TFT disposed at crossings of the gate lines G1 and G2 and the data lines D1 and D2, a plurality of pixel electrodes Px for charging data voltages to liquid crystal cells, and a plurality of touch/common electrodes disposed to overlap the pixel electrodes Px.

The color filter array CFA includes black matrices and color filters, which may be disposed on a second substrate SUB2. Polarizing plates POL1 and POL2 are respectively attached to external surfaces of the first substrate SUB1 and the second substrate SUB2 of the liquid crystal display panel LCP. Alignment layers for setting a pre-tilt angle of liquid crystals are respectively formed on inner surfaces of the first and second substrates SUB1 and SUB2 contacting the liquid crystals. A column spacer may be disposed between the TFT array TFTA and the color filter array CFA of the liquid crystal display panel LCP to maintain cell gaps of the liquid crystal cells.

The touch/common electrode may be disposed on the second substrate SUB2 in a vertical electric field driving manner, such as a twisted nematic (TN) mode and a vertical alignment (VA) mode. Further, the touch/common electrode may be disposed on the first substrate SUB1 along with the pixel electrodes Px in a horizontal electric field driving manner, such as an in-plane switching (IPS) mode and a fringe field switching (FFS) mode. In the following description, embodiments of the invention will be described based on the horizontal electric field driving manner by way of example.

Referring to FIGS. 4 and 5, the touch sensor integrated type display device according to a first embodiment of this disclosure includes an active area AA and a bezel area BA. The active area AA is an area in which touch/common electrodes Tx11 to Txjk are arranged and data are displayed. The bezel area BA is positioned outside the active area AA. In the bezel area BA, various wires and a source and touch driving integrated circuit 130 are disposed.

The active area AA includes a plurality of touch/common electrodes Tx11 to Txj1, Tx12 to Txj2, ..., and Tx1k to Txjk, and a plurality of touch/common routing wires TW connected to the plurality of touch/common electrodes Tx11 to Txj1, Tx12 to Txj2, ..., and Tx1k to Txjk, respectively (wherein, j and k are positive integers). The plurality of touch/common electrodes Tx11 to Txj1, Tx12 to Txj2, ..., and Tx1k to Txjk are arranged in a first direction (e.g. x-axis direction) and a second direction (e.g. y-axis direction) which cross each other. The plurality of touch/common routing wires TW are arranged in parallel to each other in the second direction. The plurality of touch/common electrodes Tx11 to Txj1, Tx12 to Txj2, ..., and Tx1k to Txjk are driven as common electrodes for displaying data during a display operation period, and as touch electrodes during a touch operation period for perceiving touch positions. The display operation period and the touch operation period are obtained by time-dividing one frame period 1F.

The plurality of touch/common routing wires TW constitute a first group of touch/common routing wires TWG1 to k-th group of touch/common routing wires TWGk. The first group of touch/common routing wires TWG1 consists of touch/common routing wires connected to touch/common electrodes Tx11 to Txj1 disposed at a first column. The second group of touch/common routing wires TWG2 consists of touch/common routing wires connected to touch/common electrodes Tx12 to Txj2 disposed at a second column. In a similar way, a k-th group of touch/common routing wires TWGk consists of touch/common routing wires connected to touch/common electrodes Tx1k to Txjk disposed at a k-th column.

The active area AA includes a plurality of dummy routing wires DW. The plurality of dummy routing wires DW constitute a first group of dummy routing wires DWG1 to k-th group of dummy routing wires DWGk. The first group of dummy routing wires DWG1 passes through (e.g., transverse, overlap, or intersect) without contacting the touch/common electrodes Tx11 to Txj1 disposed at the first column. The second group of dummy routing wires DWG2 passes through without contacting the touch/common electrodes Tx12 to Txj2 disposed at the second column. In a similar way, a k-th group of dummy routing wires TWGk passes through without contacting the touch/common electrodes Tx1k to Txjk disposed at the k-th column.

The first group of dummy routing wires DWG1 may include a first left group of dummy routing wires DWG1a disposed at a left side of the first group of touch/common routing wires TWG1 and a first right group of dummy routing wires DWG1b disposed at a right side of the first group of touch/common routing wires TWG1. In FIG. 4, the first left group of dummy routing wires DWG1a and the first right group of dummy routing wires DWG1b are respectively disposed at both sides (or opposite sides) of the first group of touch/common routing wires TWG1. However, this disclosure is not limited thereto, and the first left group of dummy routing wires DWG1a and the first right group of dummy routing wires DWG1b may be disposed at any one side of the first group of touch/common routing wires TWG1. In any instance, the dummy routing wires DW belonging to the first group of dummy routing wires DWG1, and the touch/common routing wires TW belonging to the first group of touch/common routing wires TWG1 may be regularly arranged on the touch/common electrodes Tx11 to Txj1 disposed at the first column.

The second group of dummy routing wires DWG2 may include a second left group of dummy routing wires DWG2a disposed at a left side of the second group of touch/common routing wires TWG2 and a second right group of dummy routing wires DWG2b disposed at a right side of the second group of touch/common routing wires TWG2. In FIG. 4, the second left group of dummy routing wires DWG2a and the second right group of dummy routing wires DWG2b are respectively disposed at both sides of the second group of touch/common routing wires TWG2. However, this disclosure is not limited thereto, and the second left group of dummy routing wires DWG2a and the second right group of dummy routing wires DWG2b may be disposed at one side of the second group of touch/common routing wires TWG2. In any instance, the dummy routing wires DW belonging to the second group of dummy routing wires DWG2, and the touch/common routing wires TW belonging to the second group of touch/common routing wires TWG2 may be regularly arranged on the touch/common electrodes Tx12 to Txj2 disposed at the second column.

The k-th group of dummy routing wires DWGk may include a k-th left group of dummy routing wires DWGka disposed at a left side of the k-th group of touch/common routing wires TWGk and a k-th right group of dummy routing wires DWGkb disposed at a right side of the k-th group of touch/common routing wires TWGk. In FIG. 4, the k-th left group of dummy routing wires DWGka and the k-th right group of dummy routing wires DWGkb are respectively disposed at both sides of the k-th group of touch/common routing wires TWGk. However, this disclosure is not limited thereto, and the k-th left group of dummy routing wires DWGka and the k-th right group of dummy routing wires DWGkb may be disposed at one side of the k-th group of touch/common routing wires TWGk. In any instance, the dummy routing wires DW belonging to the k-th group of dummy routing wires DWGk, and the touch/common routing wires TW belonging to the k-th group of touch/common routing wires TWGk may be regularly arranged on the touch/common electrodes Tx1k to Txjk disposed at the k-th column.

In FIG. 4, the touch/common routing wires TW which constitutes the first to k-th groups of touch/common routing wires TWG1 to TWGk and the dummy routing wires DW which constitutes the first to k-th groups of dummy routing wires DWG1 to DWGk are overlapped with the data lines, respectively. By doing so, it is possible to prevent the decrease of the aperture ratio due to the touch/common routing wirings (or wires) TW and the dummy routing wirings DW.

The bezel area BA includes the touch/common routing wires TW which constitute the first to k-th groups of touch/common routing wires TWG1 to TWGk extended from the active area AA, and a modulation signal wire MW for connecting the dummy routing wires DW which constitute the first to k-th groups of dummy routing wires DWG1 to DWGk.

The bezel area BA further includes the source and touch driving integrated circuit 130 and a modulation signal supplier 140. The source and touch driving integrated circuit 130 supplies a common voltage and a touch driving signal to the touch/common routing wires TW by a time division method of time-dividing one frame period into a display operation period and a touch operation period, and receives sensing signals sensed from the touch/common electrodes Tx11 to Txjk through the touch/common routing wires TW.

The modulation signal supplier 140 supplies a modulation signal to the modulation signal wire MW and the source and touch driving integrated circuit 130. The modulation signal supplier 140 may be disposed outside of the display device to supply the modulation signal the modulation signal wire MW and the source and touch driving integrated circuit 130 via a flexible printed circuit. The modulation signal may include a common voltage Vcom, a touch driving signal TSP and a load free diving signal LFD as shown in FIG. 6.

Referring FIG. 6, during the display operation period DP, the modulation signal supplier 140 supplies the common voltage Vcom to the source and touch driving integrated circuit 130 and the modulation signal wire MW, and the source and touch driving integrated circuit 130 supplies the common voltage Vcom to the touch/common electrodes Tx11 to Txjk via the touch/common routing wires TW.

The modulation signal supplier 140 supplies the touch driving signal TSP to the source and touch driving integrated circuit 130 and supplies the load free driving signal LFD having the same phase and amplitude as the touch driving signal TSP to the modulation signal wire MW during the touch operation period TP. The source and touch driving integrated circuit 130 supplies the touch driving signal TSP to the touch/common electrodes Tx11 to Txjk via the touch/common routing wires TW during the touch operation period TP.

The bezel area BA may further include electrostatic discharge circuits ESD connected between the data lines DL and a ground wire GW. The ground wire GW may be connected to the modulation supplier 140.

According to the first embodiment of this disclosure, liquid crystal molecules are driven by a voltage difference between the common voltage Vcom supplied to the touch/common electrodes and the data voltages supplied to the pixel electrodes during a display operation period, thereby varying transmittance of light. Accordingly, it is possible to display images on the display panel. On the other hand, during a touch operation period, the touch driving signal TSP is supplied to the touch/common routing wires TW, and the load free driving signal LFD having the same phase and amplitude as the touch driving signal TSP is supplied to the dummy routing wires DW. There is no parasitic capacitance between the touch/common electrodes Tx11 to Txjk and the dummy routing wires DW because the same signal is supplied to the touch/common electrodes Tx11 to Txjk and the dummy routing wires DW. Accordingly, a visible mura due to a light leakage that may be generated by the parasitic capacitance formed between the touch/common electrodes Tx11 to Txjk and the dummy routing wirings DW is not generated, and the display image defect can be prevented.

Also, when inspecting wiring fault, it is possible to smoothly carry out open and short inspection of the touch/common routing wires TW and the dummy routing wires DW because the touch/common routing wirings TW and the dummy routing wirings DW have a configuration connected without a disconnected portion in the active region AA.

Next, a touch sensor integrated type display device according to a second embodiment of this disclosure is described below with reference to FIGS. 7 and 8.

Figure 7:
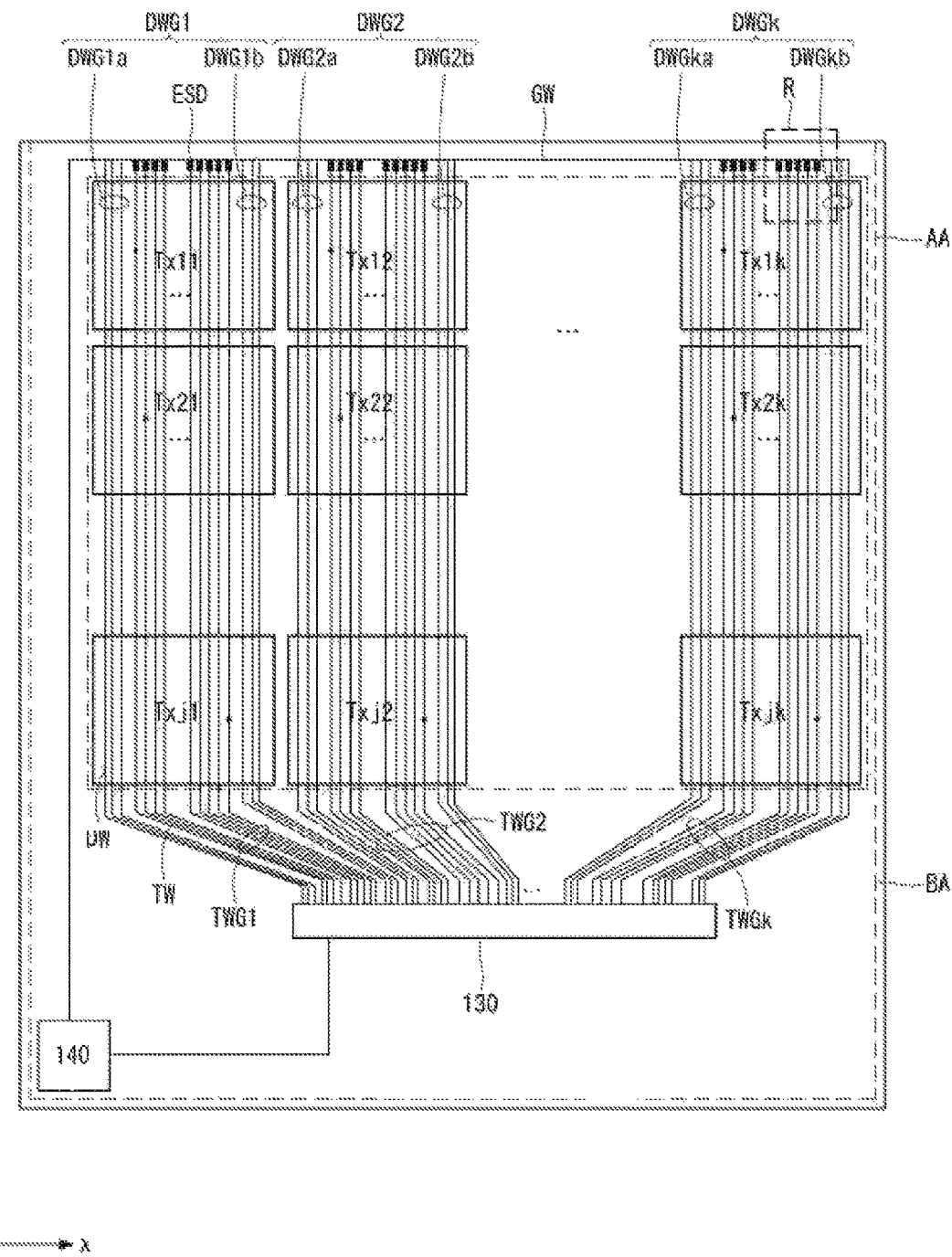
FIG. 7 is a planar view schematically showing a touch sensor integrated type display device according to a second embodiment of this disclosure.

FIG. 7 is a planar view schematically showing a touch sensor integrated type display device according to a second embodiment of this disclosure. FIG. 8 is a waveform diagram illustrating modulation signals supplied to dummy routing wires and touch routing wires shown in FIG. 7.

Referring to FIG. 7, the touch sensor integrated type display device according to a second embodiment of this disclosure includes an active area AA and a bezel area BA. The active area AA is an area in which touch/common electrodes Tx11 to Txjk are arranged and data are displayed. The bezel area BA is positioned outside the active area AA. In the bezel area BA, various wires and a source and touch driving integrated circuit 130 are disposed.

The active area AA includes a plurality of touch/common electrodes Tx11 to Txj1, Tx12 to Txj2, . . . , and Tx1k to Txjk, and a plurality of touch/common routing wires TW connected to the plurality of touch/common electrodes Tx11 to Txj1, Tx12 to Txj2, . . . , and Tx1k to Txjk, respectively (wherein, j and k are a positive integer). The plurality of touch/common electrodes Tx111 to Txj1, Tx12 to Txj2, . . . , and Tx1k to Txjk are arranged in a first direction (e.g. x-axis direction) and a second direction (e.g. y-axis direction) which cross each other. The plurality of touch/common routing wires TW are arranged in parallel to each other in the second direction.

The plurality of touch/common routing wires TW constitute a first group of touch/common routing wires TWG1 to k-th group of touch/common routing wires TWGk. The first group of touch/common routing wires TWG1 consists of touch/common routing wires connected to touch/common electrodes Tx11 to Txj1 disposed at a first column. The second group of touch/common routing wires TWG2 consists of touch/common routing wires connected to touch/common electrodes Tx12 to Txj2 disposed at a second column. In a similar way, a k-th group of touch/common routing wires TWGk consists of touch/common routing wires connected to touch/common electrodes Tx1k to Txjk disposed at a k-th column.

The active area AA includes a plurality of dummy routing wires DW. The plurality of dummy routing wires DW constitute a first group of dummy routing wires DWG1 to k-th group of dummy routing wires DWGk. The first group of dummy routing wires DWG1 passes through without contacting the touch/common electrodes Tx11 to Txj1 disposed at the first column. The second group of dummy routing wires DWG2 passes through without contacting the touch/common electrodes Tx12 to Txj2 disposed at the second column. In a similar way, a k-th group of dummy routing wires TWGk passes through without contacting the touch/common electrodes Tx1k to Txjk disposed at the k-th column.

The first group of dummy routing wires DWG1 may include a first left group of dummy routing wires DWG1a disposed at a left side of the first group of touch/common routing wires TWG1 and a first right group of dummy routing wires DWG1b disposed at a right side of the first group of touch/common routing wires TWG1. In FIG. 7, the first left group of dummy routing wires DWG1a and the first right group of dummy routing wires DWG1b are respectively disposed at both sides of the first group of touch/common routing wires TWG1. However, this disclosure is not limited thereto, and the first left group of dummy routing wires DWG1a and the first right group of dummy routing wires DWG1b may be disposed at any one side of the first group of touch/common routing wires TWG1. In any instance, the dummy routing wires DW belonging to the first group of dummy routing wires DWG1, and the touch/common routing wires TW belonging to the first group of touch/common routing wires TWG1 may be regularly arranged on the touch/common electrodes Tx11 to Txj1 disposed at the first column.

The second group of dummy routing wires DWG2 may include a second left group of dummy routing wires DWG2a disposed at a left side of the second group of touch/common routing wires TWG2 and a second right group of dummy routing wires DWG2b disposed at a right side of the second group of touch/common routing wires TWG2. In FIG. 7, the second left group of dummy routing wires DWG2a and the second right group of dummy routing wires DWG2b are respectively disposed at both sides of the second group of touch/common routing wires TWG2. However, this disclosure is not limited thereto, and the second left group of dummy routing wires DWG2a and the second right group of dummy routing wires DWG2b may be disposed at one side of the second group of touch/common routing wires TWG2. In any instance, the dummy routing wires DW belonging to the second group of dummy routing wires DWG2, and the touch/common routing wires TW belonging to the second group of touch/common routing wires TWG2 may be regularly arranged on the touch/common electrodes Tx12 to Txj2 disposed at the second column.

The k-th group of dummy routing wires DWGk may include a k-th left group of dummy routing wires DWGka disposed at a left side of the k-th group of touch/common routing wires TWGk and a k-th right group of dummy routing wires DWGkb disposed at a right side of the k-th group of touch/common routing wires TWGk. In FIG. 7, the k-th left group of dummy routing wires DWGka and the k-th right group of dummy routing wires DWGkb are respectively disposed at both sides of the k-th group of touch/common routing wires TWGk. However, this disclosure is not limited thereto, and the k-th left group of dummy routing wires DWGka and the k-th right group of dummy routing wires DWGkb may be disposed at one side of the k-th group of touch/common routing wires TWGk. In any instance, the dummy routing wires DW belonging to the k-th group of dummy routing wires DWGk, and the touch/common routing wires TW belonging to the k-th group of touch/common routing wires TWGk may be regularly arranged on the touch/common electrodes Tx1k to Txjk disposed at the k-th column.

In FIG. 7, the touch/common routing wires TW which constitutes the first to k-th groups of touch/common routing wires TWG1 to TWGk, and the dummy routing wires DW which constitutes the first to k-th groups of dummy routing wires DWG1 to DWGk are overlapped with the data lines, respectively. By doing so, it is possible to prevent the decrease of the aperture ratio due to the touch/common routing wirings TW and the dummy routing wirings DW.

The plurality of touch/common electrodes Tx11 to Txj1, Tx12 to Txj2, . . . , and Tx1k to Txjk in the active area AA are formed by dividing a common electrode of the display device. The plurality of touch/common electrodes Tx11 to Txj1, Tx12 to Txj2, . . . , and Tx1k to Txjk are driven as common electrodes for displaying data during a display operation period, and as touch electrodes during a touch operation period for perceiving touch positions. The display operation period and the touch operation period are obtained by time-dividing one frame period.

The bezel area BA includes the touch/common routing wires TW which constitute the first to k-th groups of touch/common routing wires TWG1 to TWGk extended from the active area AA and the dummy routing wires DW which constitute the first to k-th groups of dummy routing wires DWG1 to DWGk extended from the active area AA.

The bezel area BA further includes a source and touch driving integrated circuit 130 and a modulation signal supplier 140. The source and touch driving integrated circuit 130 supplies the load free driving signal to the dummy routing wires DW, and supplies a common voltage and a touch driving signal to the touch/common routing wires TW by a time division method of time-dividing one frame period into a display operation period and a touch operation period. Also, the source and touch driving integrated circuit 130 receives a sensing signal sensed from the touch/common electrodes Tx11 to Txjk through the touch/common routing wires TW.

The modulation signal supplier 140 supplies a modulation signal to the source and touch driving integrated circuit 130. Alternatively, the modulation signal supplier 140 may be disposed outside of the display device to supply the modulation signal to the source and touch driving integrated circuit 130 via a flexible printed circuit. The modulation signals may include a common voltage Vcom, a touch driving signal TSP and a load free diving signal LFD as shown in FIG. 8.

Figure 8:
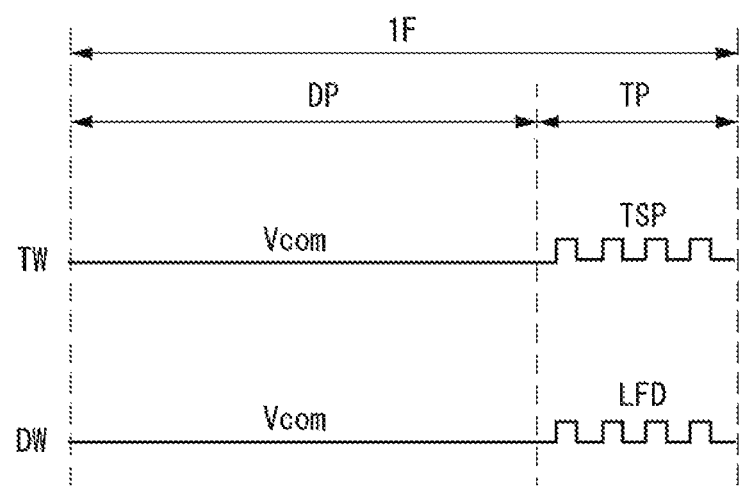
FIG. 8 is a waveform diagram illustrating modulation signals supplied to dummy routing wires and touch routing wires shown in FIG. 7.

Referring FIG. 8, during the display operation period DP, the modulation signal supplier 140 supplies the common voltage Vcom to the source and touch driving integrated circuit 130, and the source and touch driving integrated circuit 130 supplies the common voltage Vcom to the touch/common electrodes Tx11 to Txjk via the touch/common routing wires TW. Also, the source and touch driving integrated circuit 130 supplies the common voltage Vcom to the dummy routing wires DW.

The modulation signal supplier 140 supplies the touch driving signal TSP and the load free driving signal LFD having the same phase and amplitude as the touch driving signal TSP to the source and touch driving integrated circuit 130 during the touch operation period TP. The source and touch driving integrated circuit 130 supplies the touch driving signal TSP to the touch/common electrodes Tx11 to Txjk via the touch/common routing wires TW and supplies the load free driving signal LFD to the dummy routing wires DW during the touch operation period TP.

The bezel area BA may further include electrostatic discharge circuits ESD connected between the data lines DL and a ground wire GW. The ground wire GW may be connected to the modulation supplier 140.

According to the second embodiment of this disclosure, liquid crystal molecules are driven by a voltage difference between the common voltage Vcom supplied to the touch/common electrodes and the data voltages supplied to the pixel electrodes during a display operation period, thereby varying transmittance of light. Accordingly, it is possible to display images on the display panel. On the other hand, during a touch operation period, the touch driving signal TSP is supplied to the touch/common routing wires TW, and the load free driving signal LFD having the same phase and amplitude as the touch driving signal TSP is supplied to the dummy routing wires DW. There is no parasitic capacitance between the touch/common electrodes Tx11 to Txjk and the dummy routing wires DW because the same signal is supplied to the touch/common electrodes Tx11 to Txjk and the dummy routing wires DW. Accordingly, a visible mura due to a light leakage that may be generated by the parasitic capacitance formed between the touch/common electrodes Tx11 to Txjk and the dummy routing wirings DW is not generated, and the display image defect can be prevented.

Also, when inspecting wiring fault, it is possible to smoothly carry out open and short inspection of the touch/common routing wires TW and the dummy routing wires DW because the touch/common routing wirings TW and the dummy routing wirings DW have a configuration connected without a disconnected portion in the active region AA.

Next, a touch sensor integrated type display device according to a third embodiment of this disclosure is described below with reference to FIGS. 9 and 10.

Figure 9:
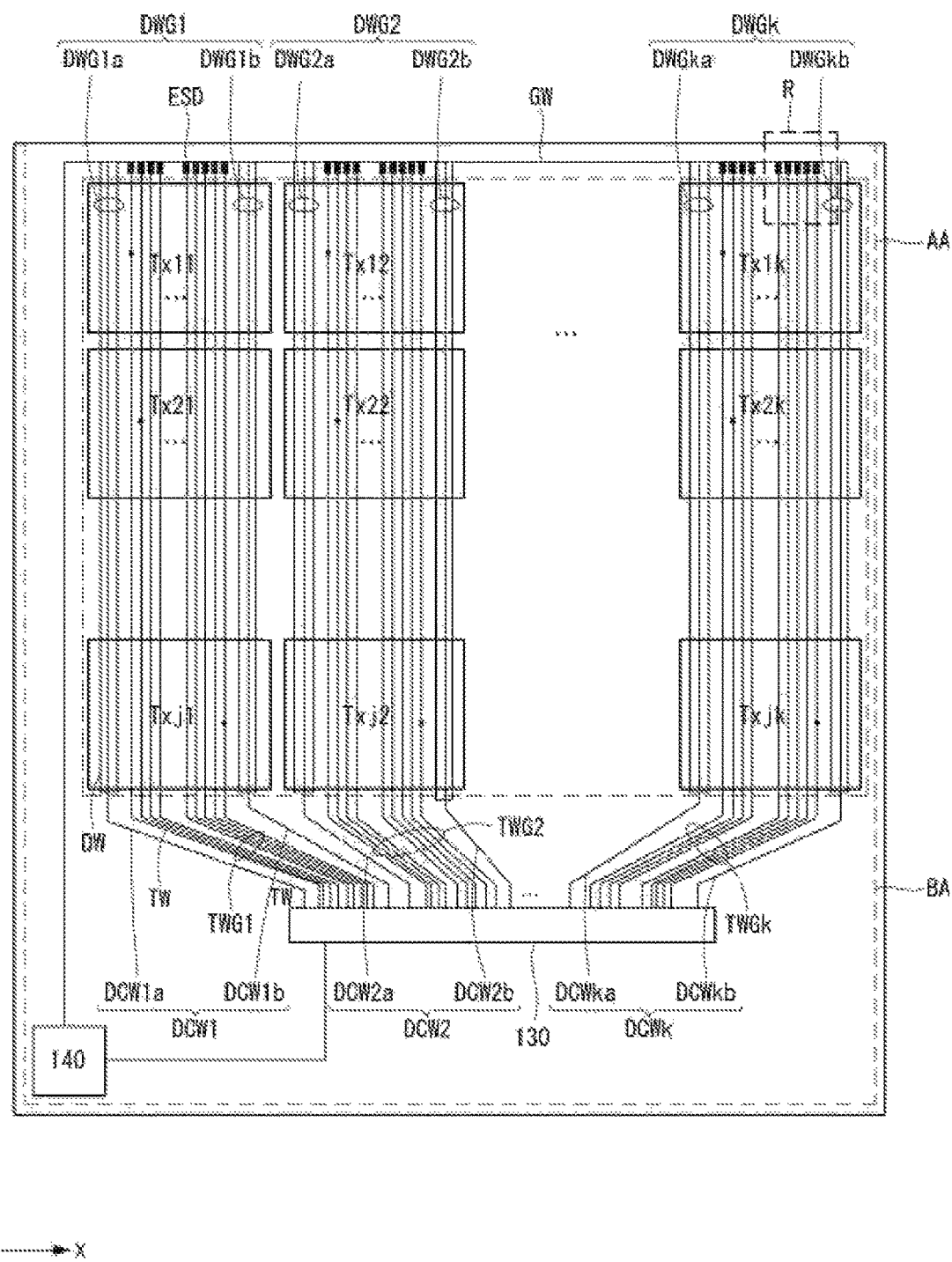
FIG. 9 is a planar view schematically showing a touch sensor integrated type display device according to a third embodiment of this disclosure.
Figure 10:
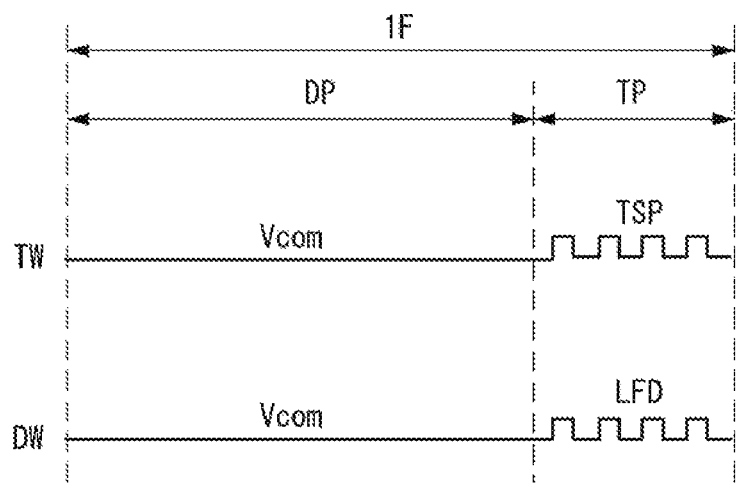
FIG. 10 is a waveform diagram illustrating modulation signals supplied to dummy routing wires and touch routing wires shown in FIG. 9.

FIG. 9 is a planar view schematically showing a touch sensor integrated type display device according to a third embodiment of this disclosure. FIG. 10 is a waveform diagram illustrating modulation signals supplied to dummy routing wires and touch routing wires shown in FIG. 9.

Referring to FIG. 9, the touch sensor integrated type display device according to a third embodiment of this disclosure includes an active area AA and a bezel area BA. The active area AA is an area in which touch/common electrodes Tx11 to Txjk are arranged and data are displayed. The bezel area BA is positioned outside the active area AA. In the bezel area BA, various wires and a source and touch driving integrated circuit 130 are disposed.

The active area AA includes a plurality of touch/common electrodes Tx11 to Txj1, Tx12 to Txj2, . . . , and Tx1k to Txjk, and a plurality of touch/touching routing wires TW connected to the plurality of touch/common electrodes Tx11 to Txj1, Tx12 to Txj2, . . . , and Tx1k to Txjk, respectively (wherein, j and k are a positive integer). The plurality of touch/common electrodes Tx111 to Txj1, Tx12 to Txj2, . . . , and Tx1k to Txjk are arranged in a first direction (e.g. x-axis direction) and a second direction (e.g. y-axis direction) which cross each other. The plurality of touch/common routing wires TW are arranged in parallel to each other in the second direction.

The plurality of touch/common routing wires TW constitute a first group of touch/common routing wires TWG1 to k-th group of touch/common routing wires TWGk. The first group of touch/common routing wires TWG1 consists of touch/common routing wires connected to touch/common electrodes Tx11 to Txj1 disposed at a first column. The second group of touch/common routing wires TWG2 consists of touch/common routing wires connected to touch/common electrodes Tx12 to Txj2 disposed at a second column. In a similar way, a k-th group of touch/common routing wires TWGk consists of touch/common routing wires connected to touch/common electrodes Tx1k to Txjk disposed at a k-th column.

The active area AA includes a plurality of dummy routing wires DW. The plurality of dummy routing wires DW constitute a first group of dummy routing wires DWG1 to k-th group of dummy routing wires DWGk. The first group of dummy routing wires DWG1 passes through without contacting the touch/common electrodes Tx11 to Txj1 disposed at the first column. The second group of dummy routing wires DWG2 passes through without contacting the touch/common electrodes Tx12 to Txj2 disposed at the second column. In a similar way, a k-th group of dummy routing wires TWGk passes through without contacting the touch/common electrodes Tx1k to Txjk disposed at the k-th column.

The first group of dummy routing wires DWG1 may include a first left group of dummy routing wires DWG1a disposed at a left side of the first group of touch/common routing wires TWG1 and a first right group of dummy routing wires DWG1b disposed at a right side of the first group of touch/common routing wires TWG1. In FIG. 9, the first left group of dummy routing wires DWG1a and the first right group of dummy routing wires DWG1b are respectively disposed at both sides of the first group of touch/common routing wires TWG1. However, this disclosure is not limited thereto, and the first left group of dummy routing wires DWG1a and the first right group of dummy routing wires DWG1b may be disposed at any one side of the first group of touch/common routing wires TWG1. In any instance, the dummy routing wires DW belonging to the first group of dummy routing wires DWG1, and the touch/common routing wires TW belonging to the first group of touch/common routing wires TWG1 may be regularly arranged on the touch/common electrodes Tx11 to Txj1 disposed at the first column.

The second group of dummy routing wires DWG2 may include a second left group of dummy routing wires DWG2a disposed at a left side of the second group of touch/common routing wires TWG2 and a second right group of dummy routing wires DWG2b disposed at a right side of the second group of touch/common routing wires TWG2. In FIG. 9, the second left group of dummy routing wires DWG2a and the second right group of dummy routing wires DWG2b are respectively disposed at both sides of the second group of touch/common routing wires TWG2. However, this disclosure is not limited thereto, and the second left group of dummy routing wires DWG2a and the second right group of dummy routing wires DWG2b may be disposed at one side of the second group of touch/common routing wires TWG2. In any instance, the dummy routing wires DW belonging to the second group of dummy routing wires DWG2, and the touch/common routing wires TW belonging to the second group of touch/common routing wires TWG2 may be regularly arranged on the touch/common electrodes Tx12 to Txj2 disposed at the second column.

The k-th group of dummy routing wires DWGk may include a k-th left group of dummy routing wires DWGka disposed at a left side of the k-th group of touch/common routing wires TWGk and a k-th right group of dummy routing wires DWGkb disposed at a right side of the k-th group of touch/common routing wires TWk2. In FIG. 9, the k-th left group of dummy routing wires DWGka and the k-th right group of dummy routing wires DWGkb are respectively disposed at both sides of the k-th group of touch/common routing wires TWGk. However, this disclosure is not limited thereto, and the k-th left group of dummy routing wires DWGka and the k-th right group of dummy routing wires DWGkb may be disposed at one side of the k-th group of touch/common routing wires TWGk. In any instance, the dummy routing wires DW belonging to the k-th group of dummy routing wires DWGk, and the touch/common routing wires TW belonging to the k-th group of touch/common routing wires TWGk may be regularly arranged on the touch/common electrodes Tx1k to Txjk disposed at the k-th column.

In FIG. 9, the touch/common routing wires TW which constitutes the first to k-th groups of touch/common routing wires TWG1 to TWGk, and the dummy routing wires DW which constitutes the first to k-th groups of dummy routing wires DWG1 to DWGk are overlapped with the data lines, respectively. By doing so, it is possible to prevent the decrease of the aperture ratio due to the touch/common routing wirings TW and the dummy routing wirings DW.

The plurality of touch/common electrodes Tx11 to Txj1, Tx12 to Txj2, . . . , and Tx1k to Txjk in the active area AA are formed by dividing a common electrode of the display device. The plurality of touch/common electrodes Tx11 to Txj1, Tx12 to Txj2, . . . , and Tx1k to Txjk are driven as common electrodes for displaying data during a display operation period, and as touch electrodes during a touch operation period for perceiving touch positions. The display operation period and the touch operation period are obtained by time-dividing one frame period.

The bezel area BA includes the touch/common routing wires TW which constitute the first to k-th groups of touch/common routing wires TWG1 to TWGk extended from the active area AA and dummy connection wires DCW1a to DCWkb which connects the dummy routing wires DW in a predetermined unit in the active area AA. The dummy connection wires DCW1a to DCWkb includes the first left dummy connection wire DCW1a connecting dummy routing wires DW belonging to the first left group of dummy routing wires DWG1a, the first right dummy connection wire DCW1b connecting dummy routing wires DW belonging to the first group right dummy routing wires DWG1b, the second left dummy connection wire DCW2a connecting dummy routing wires DW belonging to the second left group of dummy routing wires DWG2a, the second right dummy connection wire DCW2b connecting dummy routing wires DW belonging to the second right group of dummy routing wires DWG2b, . . . , the k-th left dummy connection wire DCWka connecting dummy routing wires DW belonging to the k-th left group of dummy routing wires DWGka, and the k-th right dummy connection wire DCWkb connecting dummy routing wires DW belonging to the k-th right group of dummy routing wires DWGkb.

The bezel area BA further includes a source and touch driving integrated circuit 130 and a modulation signal supplier 140. The modulation signal supplier 140 supplies a common voltage Vcom, a touch driving signal TSP and a load free driving signal LFD to the source and touch driving integrated circuit 130. The source and touch driving integrated circuit 130 supplies the common voltage Vcom and the load free driving signal LFD to the first left to k-th right groups of dummy routing wires DWG1a to DWGkb through the first left to k-th right dummy connection wires DCW1a to DCWkb, respectively.

Referring to FIG. 9, the modulation signal supplier 140 supplies the touch common voltage Vcom to the source and touch driving integrated circuit 130 during a display operation period. The source and touch driving integrated circuit 130 supplies the common voltage Vcom to the touch/common electrodes Tx11 to Txjk via the touch/common routing wires TW during the display operation period. Also, the source and touch driving integrated circuit 130 supplies the common voltage Vcom to the dummy routing wires DW.

The modulation signal supplier 140 supplies the touch driving signal TSP and the load free driving signal LFD having the same phase and amplitude as the touch driving signal TSP to the source and touch driving integrated circuit 130 during the touch operation period TP. The source and touch driving integrated circuit 130 supplies the touch driving signal TSP to the touch/common electrodes Tx11 to Txjk through the touch/common routing wires TW and supplies the load free driving signal LFD to the dummy routing wires DW through the first left to k-th right dummy connection wires DCW1a to DCWkb during the touch operation period TP.

The bezel area BA may further include electrostatic discharge circuits ESD connected between the data lines DL and a ground wire GW. The ground wire GW may be connected to the modulation supplier 140.

According to the third embodiment of this disclosure, liquid crystal molecules are driven by a voltage difference between the common voltage Vcom supplied to the touch/common electrodes and the data voltages supplied to the pixel electrodes during a display operation period, thereby varying transmittance of light. Accordingly, it is possible to display images on the display panel. On the other hand, during a touch operation period, the touch driving signal TSP is supplied to the touch/common routing wires TW, and the load free driving signal LFD having the same phase and amplitude as the touch driving signal TSP is supplied to the dummy routing wires DW. There is no parasitic capacitance between the touch/common electrodes Tx11 to Txjk and the dummy routing wires DW because the same signal is supplied to the touch/common electrodes Tx11 to Txjk and the dummy routing wires DW. Accordingly, a visible mura due to a light leakage that may be generated by the parasitic capacitance formed between the touch/common electrodes Tx11 to Txjk and the dummy routing wirings DW is not generated, and the display image defect can be prevented.

Also, when inspecting wiring fault, it is possible to smoothly carry out open and short inspection of the touch/common routing wires TW and the dummy routing wires DW because the touch/common routing wirings TW and the dummy routing wirings DW have a configuration connected without a disconnected portion in the active region AA.

Those skilled in the art will understand that the present invention may be changed and modified in various ways without departing from the technical spirit of the present invention through the aforementioned contents. Accordingly, the technical scope of the present invention is not limited to the contents described in the detailed description of the specification, but should be determined by the claims.

What is claimed is:

1. A touch sensor integrated type display device comprising:
    a plurality of gate lines;
    a plurality of data lines crossing over the plurality of gate lines;
    a plurality of pixel electrodes to which data signals are supplied through the plurality of data lines;
    a plurality of touch/common electrodes;
    a plurality of touch/common routing wires connected to the plurality of touch/common electrodes to supply a common voltage and a touch driving signal based on a time division method of time-dividing one frame period into a display operation period and a touch operation period; and
    a plurality of dummy routing wires transversing the plurality of touch/common electrodes in an active area of the display device and arranged in the same direction with the plurality of touch/common routing wires, the plurality of dummy routing wires not connected to the plurality of touch/common electrodes in the active area,
    wherein the common voltage is supplied to the plurality of touch/common routing wires during the display operation period,
    wherein the touch driving signal is supplied to the plurality of touch/common routing wires during the touch operation period and a load free driving signal is supplied to the plurality of dummy routing wires during the touch operation period, and
    wherein the load free driving signal either is the same as the touch driving signal, or has the same phase and amplitude as the touch driving signal.

2. The touch sensor integrated type display device of claim 1, wherein the common voltage is supplied to the plurality of dummy routing wires during the display operation period.

3. The touch sensor integrated type display device of claim 1, further comprising:
    a modulation signal wire connected to the plurality of dummy routing wires;
    a source and touch driving integrated circuit configured to supply the common voltage to the plurality of touch/common electrodes; and
    a modulation signal supplier configured to supply the common voltage and the load free driving signal to the modulation signal wire, and to supply the common voltage to the source and touch driving integrated circuit.

4. The touch sensor integrated type display device of claim 1, further comprising:
    a source and touch driving integrated circuit configured to supply the common voltage and the touch driving signal to the plurality of touch/common routing wires, and to supply the common voltage and the load free driving signal to the plurality of dummy routing wires; and
    a modulation signal supplier configured to supply the common voltage, the touch driving signal and the load free driving signal to the source and touch driving integrated circuit.

5. The touch sensor integrated type display device of claim 4, further comprising:
    a dummy connection wire connecting the plurality of dummy routing wires,
    wherein the source and touch driving integrated circuit is further configured to supply the common voltage and the load free driving signal to the dummy connection wire.

6. The touch sensor integrated type display device of claim 1, wherein the plurality of dummy routing wires include a first group of dummy routing wires and a second group of dummy routing wires which are respectively disposed at one side or both sides of the plurality of touch/common routing wires.

7. The touch sensor integrated type display device of claim 1, wherein the plurality of dummy routing wires overlap with the plurality of data lines.

8. The touch sensor integrated type display device of claim 1, wherein the plurality of touch/common electrodes are arranged serially in the active area of the display device, and the plurality of dummy routing wires transverse the serially arranged plurality of touch/common electrodes.

9. The touch sensor integrated type display device of claim 3, further comprising:
    a ground wire disposed adjacent to the plurality of touch/common routing wires and connected to the modulation signal supplier; and
    electrostatic discharge circuits disposed between the ground wire and the plurality of data lines, each of the electrostatic discharge circuits having one end connected to the ground wire and another end connected to each of the plurality of data lines.

10. The touch sensor integrated type display device of claim 4, further comprising:
    a ground wire disposed adjacent to the plurality of touch/common routing wires and connected to the modulation signal supplier; and
    electrostatic discharge circuits disposed between the ground wire and the plurality of data lines, each of the electrostatic discharge circuits having one end connected to the ground wire and another end connected to each of the plurality of data lines.

11. The touch sensor integrated type display device of claim 5, further comprising:

a ground wire disposed adjacent to the plurality of touch/common routing wires and connected to the modulation signal supplier; and electrostatic discharge circuits disposed between the ground wire and the plurality of data lines, each of the electrostatic discharge circuits having one end connected to the ground wire and another end connected to each of the plurality of data lines.

12. A touch sensor integrated type display panel comprising:
   a plurality of gate lines and a plurality of data lines defining a plurality of pixel regions;
   a plurality of touch/common electrodes overlapping the plurality of pixel regions;
   a plurality of touch/common routing wires connected to the plurality of touch/common electrodes; and
   a plurality of dummy routing wires transversing the plurality of touch/common electrodes in an active area of the display panel and arranged in the same direction with the plurality of touch/common routing wires,
   wherein a common voltage is supplied to the plurality of touch/common routing wires during a display operation period of one frame period,
   wherein a touch driving signal is supplied to the plurality of touch/common routing wires and a load free driving signal is supplied to the plurality of dummy routing wires during a touch operation period of the one frame period, and
   wherein the load free driving signal either is the same as the touch driving signal, or has the same phase and amplitude as the touch driving signal.

13. The touch sensor integrated type display panel of claim 12, wherein the plurality of dummy routing wires are not connected to the plurality of touch/common electrodes in the active area of the display panel.

14. A touch sensor integrated type display device comprising the touch sensor integrated type display panel of claim 12.

15. The touch sensor integrated type display device of claim 14, further comprising:
   a modulation signal wire connected to the plurality of dummy routing wires;
   a source and touch driving integrated circuit configured to supply the common voltage to the plurality of touch/common electrodes; and
   a modulation signal supplier configured to supply the common voltage and the load free driving signal to the modulation signal wire, and to supply the common voltage to the source and touch driving integrated circuit.

16. The touch sensor integrated type display device of claim 14, further comprising:
   a source and touch driving integrated circuit configured to supply the common voltage and the touch driving signal to the plurality of touch/common routing wires, and to supply the common voltage and the load free driving signal to the dummy routing wires; and
   a modulation signal supplier configured to supply the common voltage, the touch driving signal and the load free driving signal to the source and touch driving integrated circuit.

17. The touch sensor integrated type display device of claim 15, further comprising:
   a dummy connection wire connecting the plurality of dummy routing wires,
   wherein the source and touch driving integrated circuit is further configured to supply the common voltage and the load free driving signal to the dummy connection wire.

18. The touch sensor integrated type display device of claim 14, wherein the plurality of dummy routing wires include a first group of dummy routing wires and a second group of dummy routing wires which are respectively disposed at one side or both sides of the plurality of touch/common routing wires.

19. The touch sensor integrated type display device of claim 15, further comprising:
   a ground wire disposed adjacent to the plurality of touch/common routing wires and connected to the modulation signal supplier; and
   electrostatic discharge circuits disposed between the ground wire and the plurality of data lines, each of the electrostatic discharge circuits having one end connected to the ground wire and another end connected to each of the plurality of data lines.

20. The touch sensor integrated type display device of claim 14, wherein the touch operation period occurs after the display operation period in the one frame period.

* * * * *